(12) United States Patent
Schaap et al.

(10) Patent No.: US 7,757,148 B2
(45) Date of Patent: Jul. 13, 2010

(54) METHOD TO SUSPEND AUTOMATIC REPEAT REQUEST (ARQ) RESET

(75) Inventors: Wim Schaap, Kortenhoef (NE); Marcel Korndewal, Amersfoort (NE); Leon J. Zegers, Amsterdam (NE)

(73) Assignee: Motorola, Inc., Schaumburg, IL (US)

( * ) Notice: Subject to any disclaimer, the term of this patent is extended or adjusted under 35 U.S.C. 154(b) by 683 days.

(21) Appl. No.: 11/420,359

(22) Filed: May 25, 2006

(65) Prior Publication Data

US 2007/0277072 A1 Nov. 29, 2007

(51) Int. Cl.
G08C 25/02 (2006.01)
(52) U.S. Cl. .......................... 714/748; 714/18; 714/750
(58) Field of Classification Search ................ 714/748, 714/18, 750
See application file for complete search history.

(56) References Cited

U.S. PATENT DOCUMENTS

| 4,955,018 | A  | * | 9/1990 | Twitty et al. ................ 370/398 |
| 6,384,234 | B1 |   | 5/2002 | Schaeffer et al. |
| 6,384,853 | B1 | * | 5/2002 | Shaffer et al. ................ 715/867 |
| 6,522,650 | B1 | * | 2/2003 | Yonge et al. ................ 370/390 |
| 2003/0081627 | A1 | * | 5/2003 | Bao et al. .................... 370/444 |
| 2004/0052229 | A1 | * | 3/2004 | Terry et al. .................. 370/335 |
| 2005/0085227 | A1 | * | 4/2005 | Nishimura et al. .......... 455/428 |
| 2005/0152350 | A1 | * | 7/2005 | Sung et al. ................... 370/376 |
| 2006/0013156 | A1 | * | 1/2006 | Miyoshi et al. .............. 370/328 |
| 2006/0146753 | A1 | * | 7/2006 | Park et al. .................... 370/331 |
| 2006/0148478 | A1 | * | 7/2006 | Jeong et al. .................. 455/436 |

OTHER PUBLICATIONS

IEEE; "IEEE Standard for Local and metropolitan area networks, Part 16: Air Interface for Fixed Broadband Wireless Access Systems"; Jun. 24, 2004; pp. vii-xviii, 7-11, 35-36, 78-79, and 128-138.
IEEE; "IEEE Standard for Local and metropolitan area networks, Part 16: Air Interface for Fixed and Mobile Broadband Wirelss Access Systems; Amendment 2: Physical and Medium Access Control Layers for Combined Fixed and Mobile Operation in Licensed Bands and Corrigendum 1"; Feb. 28, 2006; pp. xi-xxvii, 18-20, and 78-79.

* cited by examiner

*Primary Examiner*—Scott T Baderman
*Assistant Examiner*—Enam Ahmed
(74) *Attorney, Agent, or Firm*—Sylvia Chen (57) ABSTRACT

A method (100) of operating an Automatic Repeat Request (ARQ) transmitter (102) and an ARQ receiver (104) suspends an ARQ reset under circumstances where an ARQ reset would be superfluous. When a transmitter has a final currently-available data block, it deactivates its transmitter ARQ sync loss timer (172) and transmits a 'suspend ARQ reset' signal (122). Upon receipt of the 'suspend ARQ reset' signal (122), the receiver deactivates its receiver ARQ sync loss timer (176) and sends ARQ feedback (128). At this point, the ARQ connection can be maintained without superfluous ARQ resets even when no ARQ data blocks are being sent. When resuming transmission of ARQ data blocks, the transmitter activates its transmitter ARQ sync loss timer (182) and transmits an ARQ data block (142). The receiver receives the ARQ data block, activates its receiver ARQ sync loss timer (186) and sends ARQ feedback (148).

19 Claims, 7 Drawing Sheets

FIG. 1

| SYNTAX | SIZE | NOTES |
|---|---|---|
| MAC Header() | | |
| HT | 1 BIT | 0 = GENERIC MAC HEADER<br>1 = BANDWIDTH REQUEST HEADER |
| EC | 1 BIT | IF HT = 1, EC = 0 |
| If (HT == 0){ | | |
| Type | 6 BITS | |
| ESF | 1 BIT | EXTENDED SUBHEADER FIELD. IF ESF=0, THE EXTENDED SUBHEADER IS ABSENT. IF ESF = 1, THE EXTENDED SUBHEADER IS PRESENT AND WILL FOLLOW THE GMH IMMEDIATELY. (SEE 6.3.2.2.7.) THE ESF IS APPLICABLE BOTH IN THE DL AND IN THE UL |
| CI | 1 BIT | CRC INDICATOR |
| EKS | 2 BITS | ENCRYPTION KEY SEQUENCE |
| ARQ Suspend | 1 BIT | 0 = ARQ ACTIVE<br>1 = ARQ INACTIVE |
| LEN | 11 BITS | LENGTH |
| } | | |
| else { | | |
| Type | 3 BITS | |
| BR | 19 BITS | BANDWIDTH REQUEST |
| } | | |
| CID | 16 BITS | CONNECTION IDENTIFIER |
| HCS | 8 BITS | HEADER CHECK SEQUENCE |

*FIG. 2*

| SYNTAX | SIZE | NOTES |
| --- | --- | --- |
| MAC Header() | | |
| HT | 1 BIT | 0 = GENERIC MAC HEADER<br>1 = BANDWIDTH REQUEST HEADER |
| EC | 1 BIT | IF HT = 1, EC = 0 |
| If (HT == 0){ | | |
|     Type | 6 BITS | |
|     ESF | 1 BIT | EXTENDED SUBHEADER FIELD. IF ESF=0, THE EXTENDED SUBHEADER IS ABSENT. IF ESF=1, THE EXTENDED SUBHEADER IS PRESENT AND WILL FOLLOW THE GMH IMMEDIATELY. (SEE 6.3.2.2.7.) THE ESF IS APPLICABLE BOTH IN THE DL AND IN THE UL |
|     CI | 1 BIT | CRC INDICATOR |
|     EKS | 2 BITS | ENCRYPTION KEY SEQUENCE |
|     Reserved | 1 BIT | SHALL BE SET TO ZERO |
|     LEN | 11 BITS | LENGTH |
| } | | |
|     else { | | |
|     Type | 3 BITS | |
|     BR | 19 BITS | BANDWIDTH REQUEST |
| } | | |
| CID | 16 BITS | CONNECTION IDENTIFIER |
| HCS | 8 BITS | HEADER CHECK SEQUENCE |
| ARQ Connection State Extended Subheader() | | |
| ARQ connection state | 1 BIT | 0 = ARQ ACTIVE<br>1 = ARQ INACTIVE |
| Reserved | 7 BITS | SHALL BE SET TO ZERO |

| SYNTAX | SIZE | NOTES |
|---|---|---|
| ARQ_Reset_Message_Format() | | |
| Management Message Type = 35 | 8 BITS | |
| Connection ID | 16 BITS | CID FOR WHICH THIS MESSAGE REFERS TO |
| Type | 2 BITS | 0b00 = ORIGINAL MESSAGE FROM INITIATOR<br>0b01 = ACKNOWLEDGMENT FROM RESPONDER<br>0b10 = CONFIRMATION FROM INITIATOR<br>0b11 = ARQ CONNECTION INACTIVE ←410 |
| Direction | 2 BITS | 0b00 = UPLINK OR DOWNLINK<br>0b01 = UPLINK<br>0b10 = DOWNLINK<br>0b11 = RESERVED |
| Reserved | 4 BITS | SHALL BE SET TO ZERO |

METHOD TO SUSPEND AUTOMATIC REPEAT REQUEST (ARQ) RESET

FIELD OF THE DISCLOSURE

This disclosure relates generally to an automatic repeat request (ARQ) mechanism in the IEEE Standard 802.16 for Wireless Local and Metropolitan Area Networks.

BACKGROUND OF THE DISCLOSURE

In an IEEE 802.16 system, an automatic repeat request (ARQ) mechanism can be used on a per-connection basis to increase the probability that medium access control (MAC) layer service data units (SDUs) that are transferred over the wireless connection arrive at the receiver.

An ARQ transmitter has a state machine as described in IEEE 802.16 Section 6.3.4.6.2 with ARQ data blocks in one of four states: not sent, outstanding, discarded, and waiting-for-retransmission. An ARQ receiver also has a state machine. Synchronization of the transmitter and receiver ARQ state machines is governed in two manners. There is a transmitter ARQ sync loss timer managed by the transmitter state machine, and each instance where ARQ_TX_WINDOW_START is updated, the transmitter ARQ sync loss timer is reset. When the transmitter ARQ sync loss timer exceeds the value of ARQ_SYNC_LOSS_TIMEOUT, the transmitter state machine initiates a reset of the connection's state machines. Simultaneously, synchronization of the ARQ state machines is also governed by another timer managed by the receiver state machine. Each instance where ARQ_RX_WINDOW_START is updated, a receiver ARQ sync loss timer is reset. When the receiver ARQ sync loss timer exceeds the value of ARQ_SYNC_LOSS_TIMEOUT, the receiver state machine initiates a reset of the connection's state machines.

Thus, a reset of a connection's state machines can be triggered by either the transmitter or the receiver and is often triggered by both. During an ARQ reset, all transmitter SDUs with blocks in the discarded state are discarded, and all receiver SDUs that are incomplete are discarded. When, for any reason, there is no data available for an ARQ-enabled connection, the transmitter ARQ sync loss timer, the receiver ARQ sync loss timer, or both timers will expire and an ARQ reset will be performed. In this situation, the reset is superfluous exactly because there is no data available to transfer. Thus, there is an opportunity to avoid this superfluous reset.

Given that the maximum ARQ_SYNC_LOSS_TIMEOUT value is equivalent to 0.6 seconds, superfluous resets occur frequently when the ARQ connection is communicating using Hypertext Transfer Protocol (e.g., surfing the Internet). There are, of course, other situations where superfluous resets occur. The various aspects, features, and advantages of the disclosure will become more fully apparent to those having ordinary skill in the art upon careful consideration of the following Drawings and accompanying Detailed Description.

DETAILED DESCRIPTION

A method of operating an Automatic Repeat Request (ARQ) transmitter and an ARQ receiver suspends an ARQ reset under circumstances where an ARQ reset would be superfluous. Where a transmitter transmits its final currently-available data block, it deactivates its transmitter ARQ sync loss timer and transmits a 'suspend ARQ reset' signal. Upon receipt of the 'suspend ARQ reset' signal, the receiver deactivates its receiver ARQ sync loss timer and sends ARQ feedback. At this point, the ARQ connection can be maintained in an inactive state and without superfluous ARQ resets even when no ARQ data blocks are being sent. When resuming transmission of ARQ data blocks, the transmitter activates its transmitter ARQ sync loss timer and transmits a 'resume ARQ reset' signal. The 'resume ARQ reset' signal can be implied from transmission of at least one ARQ data block or it can be explicitly indicated. The 'resume ARQ reset' signal indicates to the receiver that the ARQ-enabled connection has changed to an active state. The receiver activates its receiver ARQ sync loss timer and sends ARQ feedback.

The 'suspend ARQ reset' signal can be included within a Medium Access Control (MAC) Protocol Data Unit (MPDU) that contains the final currently-available data block, or the 'suspend ARQ reset' signal can be sent using a message that is separate from the MPDU of the final currently-available data block. For example, the 'suspend ARQ reset' signal can be implemented as a single-bit indication in a Medium Access Control (MAC) header or as a single-bit indication in an ARQ-related MAC management message, such as an ARQ Reset Message. The method can be used by a communication device having a transceiver capable of operating in either an ARQ transmitter mode or an ARQ receiver mode.

Figure 1:
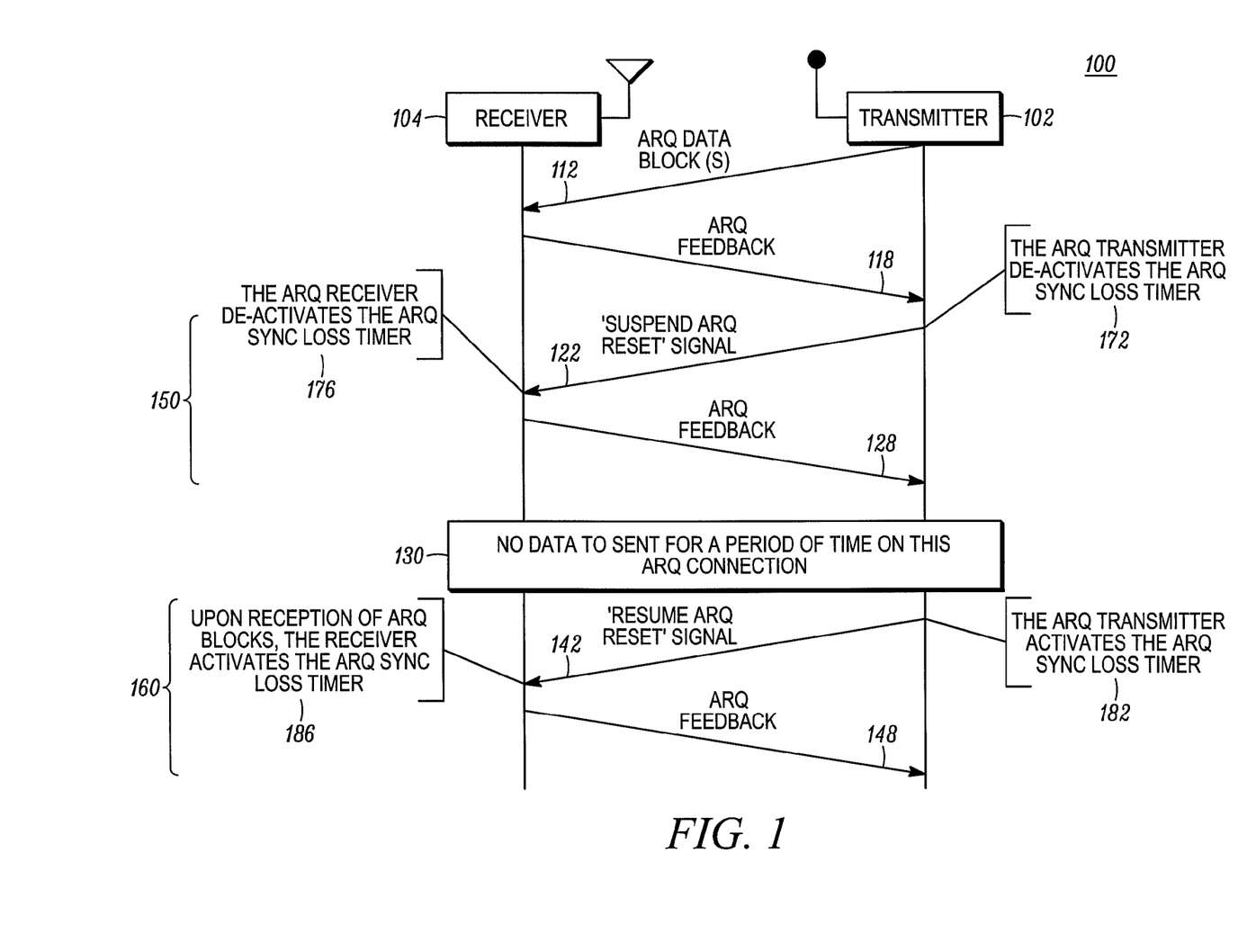
FIG. 1 shows a signal flow diagram illustrating a suspended ARQ reset mechanism and a resumed ARQ reset mechanism according to an embodiment.

FIG. 1 shows a signal flow diagram 100 illustrating a suspended ARQ reset mechanism 150 and a resumed ARQ reset mechanism 160 according to an embodiment. There is an ARQ transmitter 102 and an ARQ receiver 104. In this embodiment, the ARQ transmitter 102 is depicted as a mobile station and the ARQ receiver 104 is depicted as a base station; however, the mobile station and base station are interchangeable.

An ARQ-enabled connection has an active state and an inactive state. Because the ARQ-enabled connection's state information is not predetermined by the ARQ receiver, the ARQ transmitter should clearly communicate connection state information to the ARQ receiver.

ARQ data block(s) 112 are sent from the ARQ transmitter 102 to the ARQ receiver 104, and positive and negative acknowledgements are signaled by ARQ feedback 118 from the ARQ receiver 104 to the ARQ transmitter 102. This cycle is well known and can be repeated for any number of ARQ data blocks equal to or greater than one.

When the ARQ transmitter has no more data blocks to send currently, the ARQ transmitter 102 deactivates its transmitter ARQ sync loss timer 172 and sends a 'suspend ARQ reset' signal 122. When the ARQ receiver 104 receives the 'suspend ARQ reset' signal 122, it deactivates its receiver ARQ sync loss timer 176 and acknowledges the signal 122 using ARQ feedback 128.

For a period of time 130 that may (but does not have to) exceed the value of ARQ_SYNC_LOSS_TIMEOUT, no data is sent by the ARQ transmitter 102 to the ARQ receiver 104. During this period of time 130, the ARQ connection is maintained in an inactive state and no ARQ reset is triggered by either the ARQ transmitter or the ARQ receiver because the transmitter ARQ sync loss timer and the receiver ARQ sync loss timer are both deactivated. If the transmitter ARQ sync loss timer and the receiver ARQ sync loss timer were not both deactivated, and the period of time 130 exceeded the value of ARQ_SYNC_LOSS_TIMEOUT, a superfluous ARQ reset would have occurred.

When the ARQ transmitter 102 seeks to transmit ARQ data blocks again, the ARQ transmitter activates its transmitter ARQ sync loss timer 182 and sends a 'resume ARQ reset' signal 142. When the 'resume ARQ reset' signal 142 is received, it indicates to the ARQ receiver 104 to activate its receiver ARQ sync loss timer 186. Then the ARQ receiver 104 acknowledges the 'resume ARQ reset' signal 142 using ARQ feedback 148. Further ARQ data blocks can be transmitted in accordance with the cycle previously described with reference to ARQ data blocks 112 and ARQ feedback 118. Note that the 'resume ARQ reset' signal 142 can be an explicit signal or it can be implied by the receipt and transmission of at least one ARQ data block after the ARQ connection has gone into an inactive state.

At this point, if no ARQ data block is transmitted by the ARQ transmitter 102, or no ARQ data block is received by the ARQ receiver 104, for a period of time equal to the value of ARQ_SYNC_LOSS_TIMEOUT, either the ARQ transmitter or the ARQ receiver or both will trigger an ARQ reset.

Figure 2:
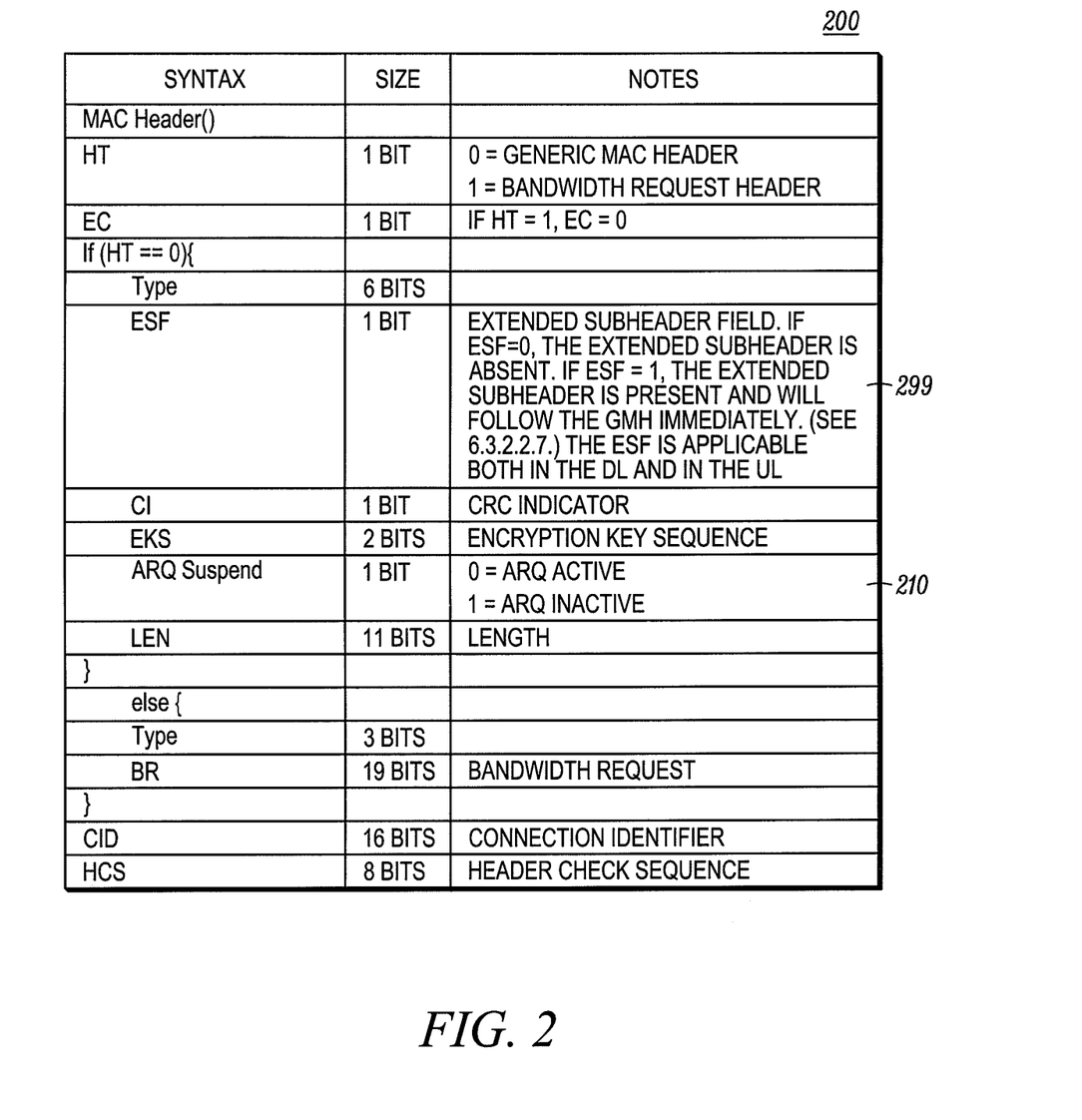
FIG. 2 shows a MAC header format for use with a first implementation of the embodiment shown in FIG. 1.
Figure 3:
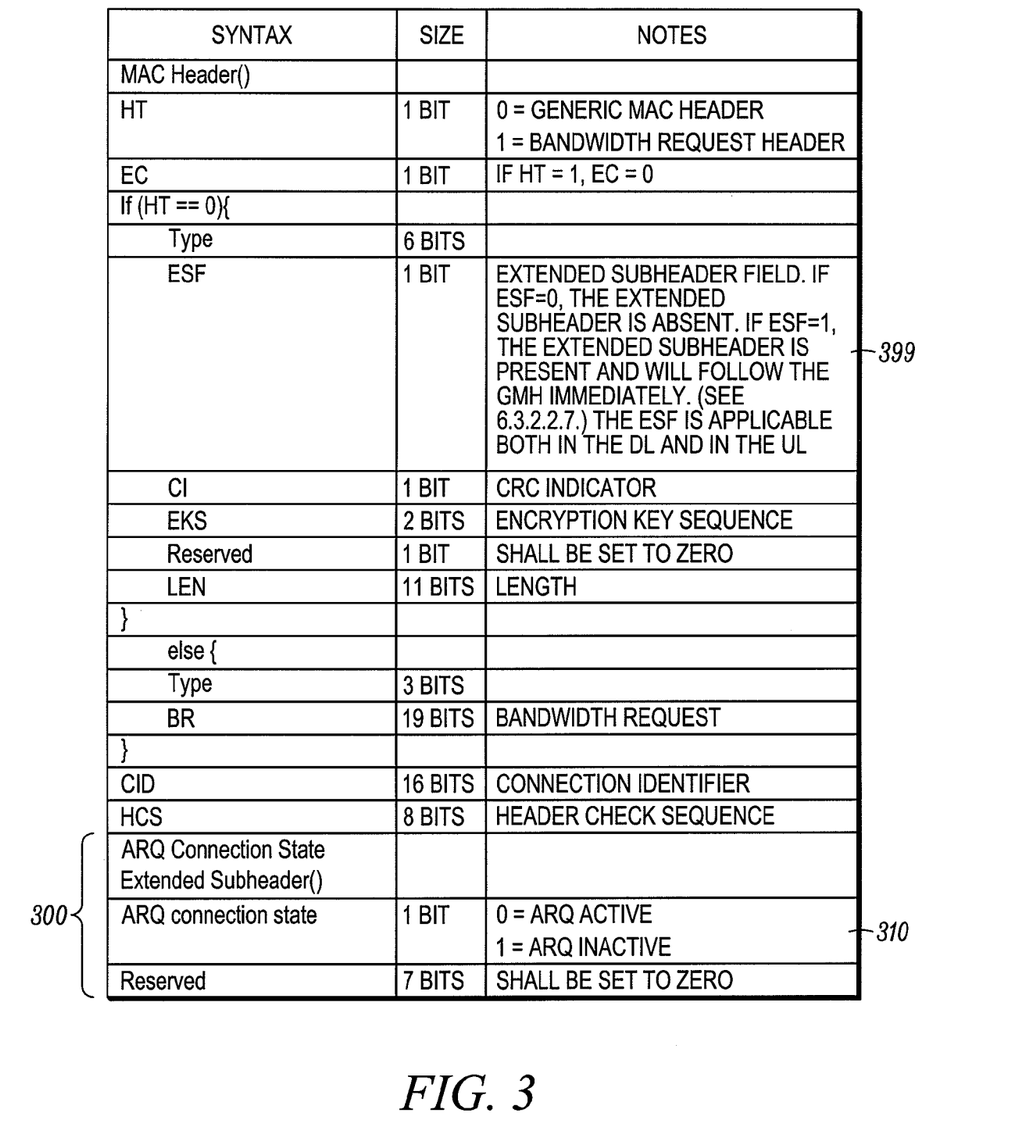
FIG. 3 shows an ARQ connection state extended subheader format for use with a second implementation of the embodiment shown in FIG. 1.
Figure 4:
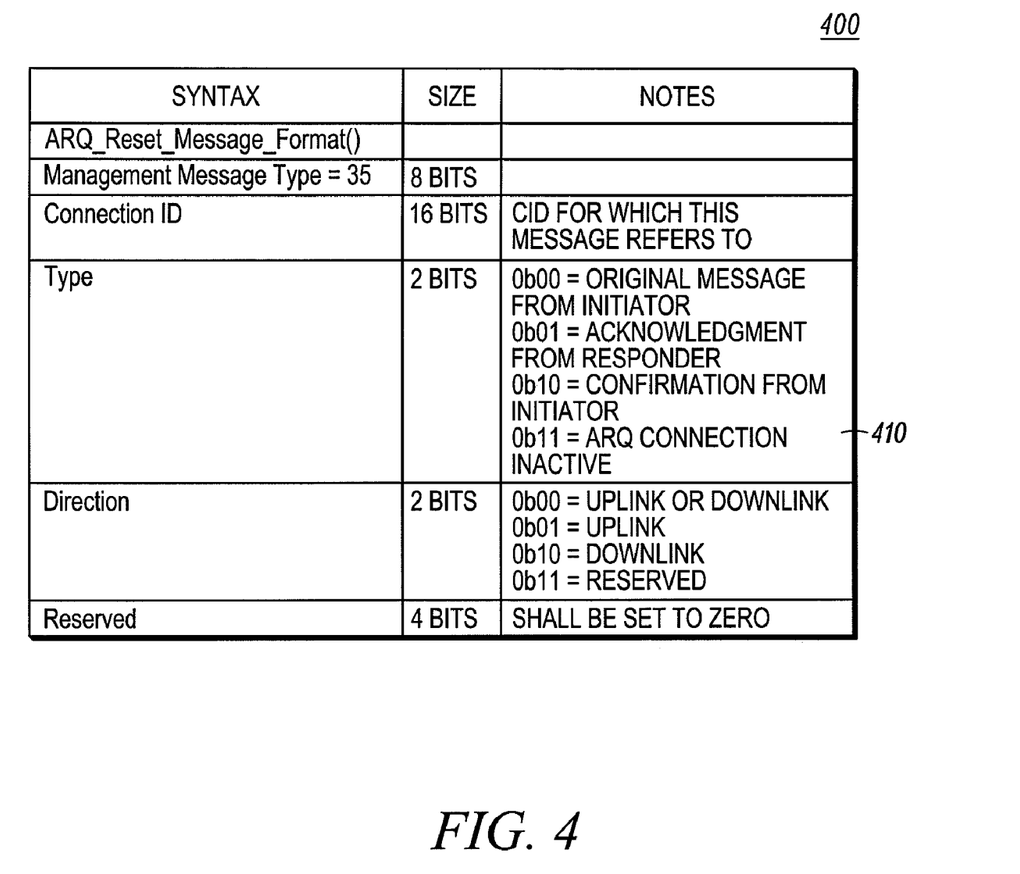
FIG. 4 shows an ARQ-related MAC management message format for use with a third implementation of the embodiment shown in FIG. 1.

The 'suspend ARQ reset' signal can be implemented as part of a Medium Access Control (MAC) Protocol Data Unit (MPDU) or in an ARQ-related MAC management message that is not an MPDU. FIG. 2 shows an implementation where the 'suspend ARQ reset' signal is indicated by a single bit in a Medium Access Control (MAC) header. FIG. 3 shows another implementation where the 'suspend ARQ reset' signal is indicated by a single bit in an extended subheader. FIG. 4 shows an implementation where the 'suspend ARQ reset' signal is indicated by the contents of a type field in an ARQ Reset Message, which is an ARQ-related MAC management message.

FIG. 2 shows a MAC header format 200 for use with a first implementation of the embodiment shown in FIG. 1. The MAC header format 200 generally conforms to a standard MAC header format described in IEEE Standard 802.16 Section 6.3.2 with a change at row 210. Instead of a reserve bit, row 210 has an ARQ Suspend bit where 0 means that the ARQ connection state is active and 1 means that the ARQ connection state is inactive.

Referring to FIG. 1, for all ARQ data blocks 112, the ARQ Suspend bit is set to 0 and the ARQ sync loss timer is active. For the 'suspend ARQ reset' signal 122, the ARQ Suspend bit of the final currently-available ARQ data block is set to 1. When an ARQ data block with the ARQ Suspend bit set to 1 is received by the ARQ receiver 104, the ARQ receiver deactivates its receiver ARQ sync loss timer. If the receiver ARQ sync loss timer was already inactive, then the ARQ receiver 104 does not need to do anything additional. When the ARQ connection becomes active again, the ARQ transmitter sends a 'resume ARQ reset' signal 142 using an ARQ data block with the ARQ Suspend bit set to 0. When an ARQ data block with the ARQ Suspend bit set to 0 is received by the ARQ receiver 104, the ARQ receiver activates its receiver ARQ sync loss timer.

FIG. 3 shows a MAC header format with an ARQ connection state extended subheader format 300 for use with a second implementation of the embodiment shown in FIG. 1. Instead of an ARQ Suspend bit in the MAC header shown in FIG. 2, the bit in the ESF field 399 of a MAC header is set to 1, and the extended subheader immediately follows the MAC header.

An ARQ Connection State bit 310 in the extended subheader indicates whether the ARQ-enabled connection is active or inactive. In order to reduce the number of occurrences where an extended subheader is required, the lack of an ARQ connection state extended subheader implies that the ARQ-enabled connection is active and thus can provide a 'resume ARQ reset' signal in an embodiment. Of course, the presence of an extended subheader with the ARQ Connection State bit 310 set to 0 explicitly states that the ARQ-enabled connection is active in another embodiment.

Referring to FIG. 1 again, for all ARQ data blocks 112, the ESF is set to 0 (and there is no row 210 for an ARQ Suspend bit as shown in FIG. 2). For the 'suspend ARQ reset' signal, a final ARQ data block has its ESF bit set to 1 and the ARQ connection state extended subheader 300 immediately follows with the ARQ Connection State bit 310 set to 1. When an ARQ data block with extended subheader having the ARQ Connection State bit set to 1 is received by the ARQ receiver 104, the ARQ receiver deactivates its receiver ARQ sync loss timer. If the receiver ARQ sync loss timer was already inactive, then the ARQ receiver 104 does not need to do anything additional. When the ARQ connection becomes active again, the ARQ transmitter sends a 'resume ARQ reset' signal 142 implemented as an MPDU without an ARQ connection state extended subheader (or sends an ARQ data block with an extended subheader having an ARQ Connection State bit set to 0). When the 'resume ARQ reset' signal 142 is received by the ARQ receiver 104, the ARQ receiver activates its receiver ARQ sync loss timer.

Thus, the ARQ transmitter uses an ARQ connection state extended subheader format 300 to inform the ARQ receiver that the ARQ-enabled connection is transitioning to from an active state to an inactive state. Upon reception of the ARQ connection state extended subheader 300 with an ARQ Connection State bit set to 1, an ARQ receiver 104 should deactivate its receiver ARQ sync loss timer. Reception of any ARQ block thereafter indicates to the ARQ receiver 104 that it should reactivate its receiver ARQ sync loss timer and implies that the ARQ connection state has transitioned from an inactive state to an active state. Alternately, reception of an ARQ data block with an extended subheader having an ARQ Connection State bit set to 0 indicates that the receiver ARQ sync loss timer should be active.

FIG. 4 shows an ARQ-related MAC management message format 400 for use with a third implementation of the embodiment shown in FIG. 1. In this implementation, the ARQ-related MAC management message is an ARQ reset message generally conforming to a standard ARQ reset message format described in IEEE Standard 802.16 Section 6.3.2.3.32 with a change at row 410. Instead of reserved bits 0b11, row 410 shows bits 0b11 indicating that the ARQ connection is inactive. Other ARQ-related MAC management messages, such as an ARQ discard message, may be used in addition to or instead of the ARQ reset message to indicate when the ARQ connection is active and inactive.

An ARQ-related MAC management message would be transmitted after the final currently-available ARQ data block to implement the 'suspend ARQ reset' signal 122 shown in FIG. 1. Although this implementation of the 'suspend ARQ reset' signal is not a part of the final currently-available data block itself, the ARQ-related MAC management message should immediately follow the final currently-available data block in the next frame.

Referring to FIG. 1, for all ARQ data blocks 112, the ARQ sync loss timer is active. A 'suspend ARQ reset' signal 122 is implemented as an ARQ reset message with the Type bits set to 0b11. When the ARQ receiver 104 receives the ARQ reset message with Type bits set to 0b11, the ARQ receiver deactivates its receiver ARQ sync loss timer. When ARQ data blocks are received again, the ARQ receiver 104 interprets the ARQ data blocks as a 'resume ARQ reset' signal 142 and activates its receiver ARQ sync loss timer. In other words, receipt of an ARQ data block implies that the ARQ connection has returned to an active state.

Figure 5:
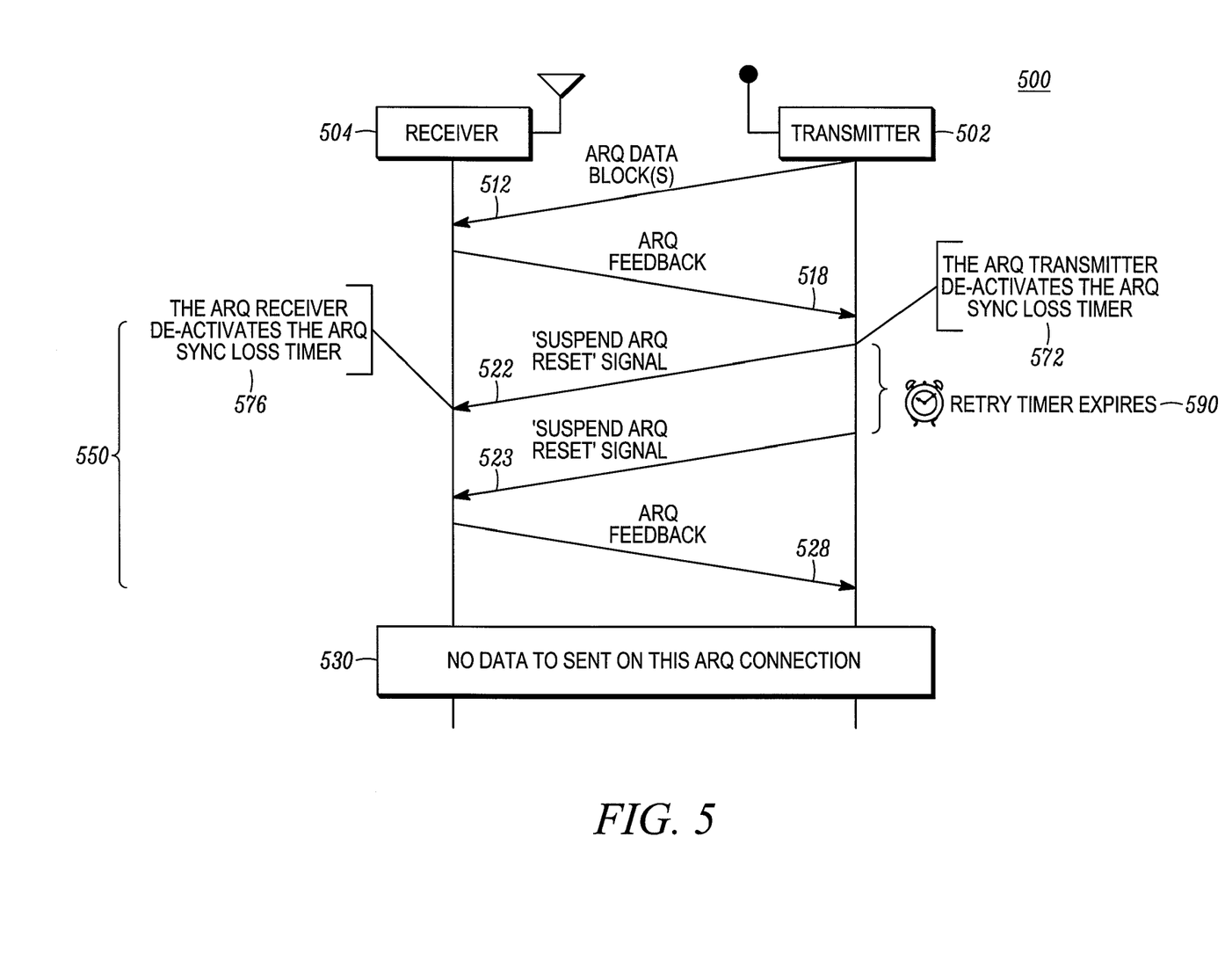
FIG. 5 shows a signal flow diagram illustrating a suspended ARQ reset mechanism where a 'suspend ARQ reset' signal is lost according to an embodiment.

FIG. 5 shows a signal flow diagram 500 illustrating a suspended ARQ reset mechanism 550 where 'suspend ARQ reset' signal 522 is lost according to an embodiment. This can happen in the first implementation (shown in FIG. 2) when the ARQ data block with the ARQ Suspend bit set to 1 is not received by the ARQ receiver 504. In the second implementation (shown in FIG. 3), this can happen when the ARQ data block with the ARQ connection state extended subheader having ARQ Connection State bit set to 1 is not received. For the third implementation (shown in FIG. 4), if an ARQ reset message with Type bits set to 0b11 is not received by the ARQ receiver 504, then the 'suspend ARQ reset' signal is lost.

As described previously with reference to FIG. 1, an ARQ transmitter 502 sends ARQ data block(s) 512 to an ARQ receiver 504, and positive and negative acknowledgements are signaled by ARQ feedback 518 from the ARQ receiver 504 to the ARQ transmitter 502. This cycle is well known and can be repeated for any number of ARQ data blocks equal to or greater than one.

When the ARQ transmitter is sending its final currently-available ARQ data blocks, the ARQ transmitter 502 deactivates its transmitter ARQ sync loss timer 572 and sends a 'suspend ARQ reset' signal 522 which is lost in transmission and does not reach the ARQ receiver 504. Thus, ARQ receiver 504 does not deactivate its receiver ARQ sync loss timer and does not respond with ARQ feedback.

Meanwhile, the transmitter ARQ retry timer reaches the ARQ_RETRY_TIMEOUT value 590 and resends the unacknowledged 'suspend ARQ reset' signal as 'suspend ARQ reset' signal 523 (along with any ARQ data blocks associated with the expired transmitter ARQ retry timer). In this example, the ARQ receiver 504 successfully receives the second 'suspend ARQ reset' signal 523, and the ARQ receiver 504 deactivates its receiver timer 576 and transmits ARQ feedback 528. Then, a time period 530 where no data is sent on the ARQ connection can exceed the value of ARQ_SYNC_LOSS_TIMEOUT without triggering a superfluous ARQ reset. When the ARQ transmitter 502 resumes sending ARQ data blocks, the resumed ARQ reset mechanism 160 shown in FIG. 1 is used.

Figure 6:
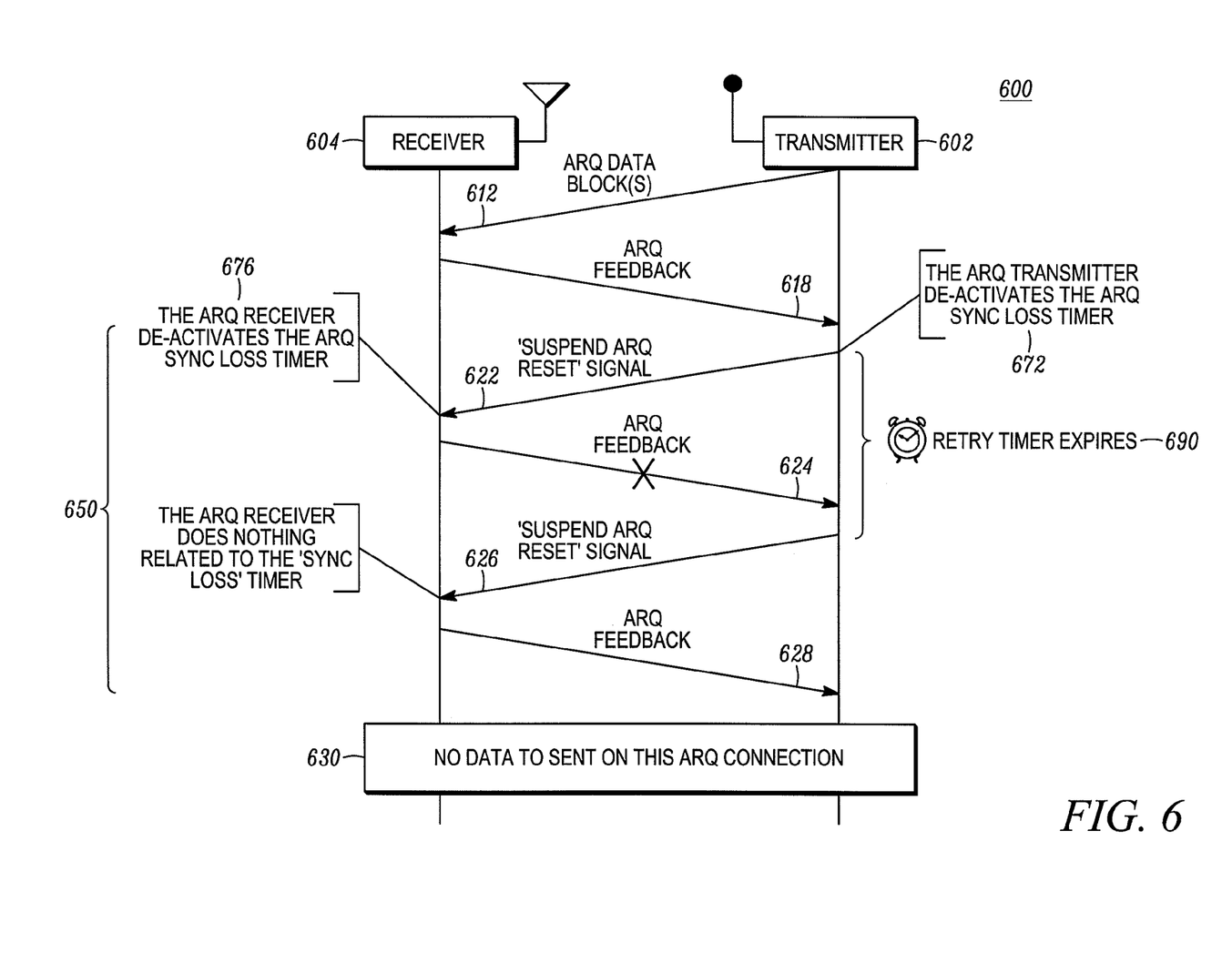
FIG. 6 shows a signal flow diagram illustrating a suspended ARQ reset mechanism where ARQ feedback to a 'suspend ARQ reset' signal is lost according to an embodiment.

FIG. 6 shows a signal flow diagram 600 illustrating a suspended ARQ reset mechanism 650 where ARQ feedback 624 to a 'suspend ARQ reset' signal is lost according to an embodiment. ARQ feedback may be lost in transmission or it may never have been sent from the ARQ receiver 604.

As described previously with reference to FIG. 1, an ARQ transmitter 602 sends ARQ data block(s) 612 to an ARQ receiver 604, and positive and negative acknowledgements are signaled by ARQ feedback 618 from the ARQ receiver 604 to the ARQ transmitter 602. This cycle is well known and can be repeated for any number of ARQ data blocks equal to or greater than one.

When the ARQ transmitter currently has no more data blocks ready to send, the ARQ transmitter 602 deactivates its transmitter ARQ sync loss timer 672 and sends a 'suspend ARQ reset' signal 622 (which might or might not include a final ARQ data block). When the ARQ receiver 604 receives the 'suspend ARQ reset' signal 622, it deactivates its receiver ARQ sync loss timer 676. Although the ARQ receiver 604 has prepared and sent ARQ feedback 624, the ARQ feedback 624 is lost in transmission and does not reach the ARQ receiver 604.

Meanwhile, the transmitter ARQ retry timer reaches the ARQ_RETRY_TIMEOUT value 690 and resends the unacknowledged 'suspend ARQ reset' signal as 'suspend ARQ reset' signal 626. In this example, the second 'suspend ARQ reset' signal 626 is successfully received by the ARQ receiver 604. In this case, the ARQ receiver 604 does not need to deactivate its receiver timer because it was deactivated earlier. The ARQ receiver 604 transmits ARQ feedback 628 which is received by the ARQ transmitter 602, and a time period 630 occurs where no data is sent on the ARQ connection and no superfluous ARQ reset is triggered. When the ARQ transmitter 602 resumes sending ARQ data blocks, the resumed ARQ reset mechanism 160 shown in FIG. 1 is used.

Figure 7:
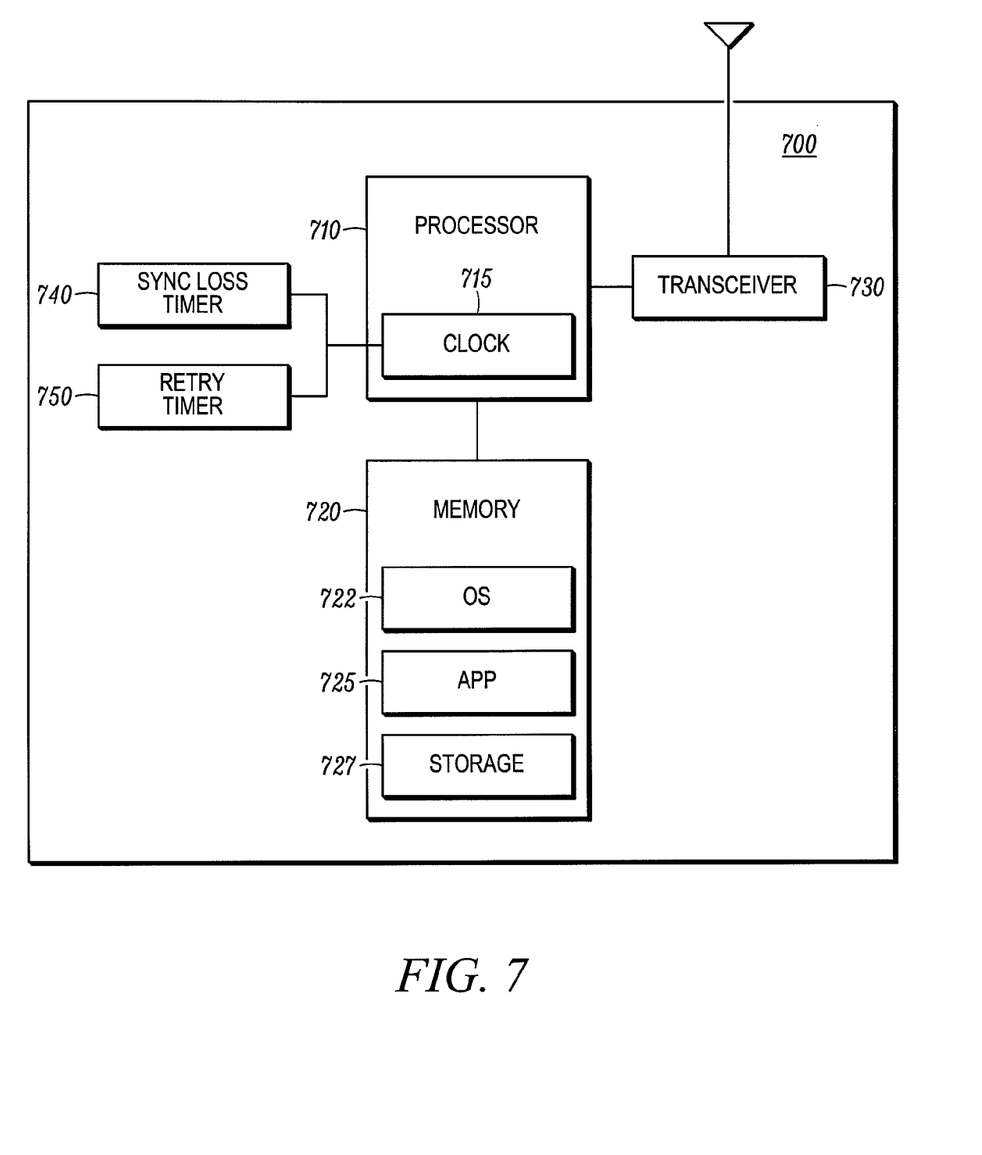
FIG. 7 shows a communication device applicable for use as either an ARQ transmitter or an ARQ receiver according to an embodiment.

FIG. 7 shows a communication device 700 applicable for use as either an ARQ transmitter or an ARQ receiver according to an embodiment. In this example, the communication device is a wireless communication device; however, the communication device could be part of a wired or wireless system (or a hybrid of the two). The wireless communication device 700 is generally compliant with the IEEE Standard 802.16 for Wireless Local and Metropolitan Area Networks and can inter-operate with other 802.16 devices. The communication device 700 has at least one transceiver 730 capable of operating in an Automatic Repeat Request (ARQ) transmitter mode or an ARQ receiver mode, such as the ARQ transmitter and receiver modes defined in the IEEE Standard 802.16. The communication device 700 includes at least one processor 710 and at least one memory 720. The memory 720 has storage capacity sufficient for the communication device operating system 722, applications 725, and general file storage 727. FIG. 7 is for illustrative purposes only and is for highlighting the main components of a communication device in accordance with the present disclosure, and is not intended to be a complete schematic diagram of the various components and connections there-between required for a communication device. Therefore, a communication may have various other components not shown in FIG. 7 (such as a user interface) and still be within the scope of the present disclosure.

Applications 725 include a software stack for an ARQ transmitter having a Medium Access Control (MAC) layer that uses the processor 710 and transceiver 730 to communicate with a software stack MAC layer in an ARQ receiver. The processor 710 includes a clock 715 that is used in conjunction with a sync loss timer 740 to determine when an ARQ_SYNC_LOSS_TIMEOUT is exceeded. The clock 715 is also coupled to a retry timer 750 to determine when an ARQ_RETRY_TIMEOUT is exceeded.

Looking at the situation when the communication device 700 is operating as in an ARQ receiver mode (e.g., ARQ receivers 104, 504, 604), when a 'suspend ARQ reset' signal is received by the transceiver 730 and passed to the processor 710, an application 725 in the memory 720 directs the processor 710 to deactivate the sync loss timer 740. When at least one further ARQ data block is received by the transceiver 730 and passed to the processor 710, an application 725 in the memory 720 directs the processor 710 to activate the sync loss timer 740.

Looking at the situation when the communication device 700 is operating in an ARQ transmitter mode (e.g., ARQ transmitters 102, 502, 602), when the ARQ transmitter has no more data blocks to send, an application 725 in the memory 720 directs the processor 710 to deactivate the sync loss timer 740 and transmit a 'suspend ARQ reset' signal (which might or might not include a final currently-available ARQ data block). When ARQ data blocks become available for transmission, the application 725 in the memory 720 directs the processor 710 to activate the sync loss timer 740 and transmit a 'resume ARQ reset' signal, which can be implemented as a standard ARQ data block (by implication) or can be explicitly indicated by a bit (or bits) in a generic MAC header, an extended subheader, or a ARQ-related MAC management message.

Thus, the method to suspend an ARQ reset prevents superfluous ARQ resets when no ARQ data blocks are being sent for a time period exceeding an ARQ_SYNC_LOSS_TIMEOUT value. By having an ARQ transmitter control the deactivation and activation of a transmitter ARQ sync loss timer, and conveying instructions for an ARQ receiver to deactivate and activate its receiver ARQ sync loss timer, the ARQ connection is maintained without an ARQ reset.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, processor 710 includes a processor that executes applications 725 having computer program code to implement the methods described herein. Embodiments include computer program code containing instructions received from tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method of operating an Automatic Repeat Request (ARQ) transmitter to suspend an ARQ reset comprising:
    deactivating a transmitter ARQ sync loss timer;
    transmitting a 'suspend ARQ reset' signal to an ARQ receiver;
    receiving ARQ feedback from the ARQ receiver in response to the transmitting; and
    sending no ARQ data for a period of time.

2. The method of claim 1 wherein the transmitting a 'suspend ARQ reset' signal comprises:
    transmitting an ARQ data block having an indication that an ARQ connection is inactive.

3. The method of claim 1 wherein the transmitting a 'suspend ARQ reset' signal comprises:
    transmitting an ARQ data block with a Medium Access Control (MAC) header containing an indication that an ARQ connection is inactive.

4. The method of claim 1 wherein the transmitting a 'suspend ARQ reset' signal comprises:
    transmitting an ARQ data block with a Medium Access Control (MAC) extended subheader containing an indication that an ARQ connection is inactive.

5. The method of claim 1 wherein the transmitting a 'suspend ARQ reset' signal comprises:
    transmitting an ARQ-related Medium Access Control (MAC) management message containing an indication that an ARQ connection is inactive.

6. The method of claim 5 wherein the ARQ-related MAC management message is an ARQ reset message.

7. The method of claim 5 wherein the ARQ-related MAC management message is an ARQ discard message.

8. The method of claim 1 wherein, if ARQ feedback is not received within an ARQ_RETRY_TIMEOUT time period:
    transmitting another 'suspend ARQ reset' signal.

9. The method of claim 1 further comprising:
    activating the transmitter ARQ sync loss timer; and
    transmitting a 'resume ARQ reset' signal.

10. The method of claim 9 wherein the 'resume ARQ reset' signal comprises an ARQ data block.

11. The method of claim 9 wherein the 'resume ARQ reset' signal consists of an ARQ data block.

12. The method of claim 1 wherein the period of time exceeds a time period represented by an ARQ sync loss timeout.

13. A method of operating an Automatic Repeat Request (ARQ) receiver to suspend an ARQ reset comprising:
    receiving a 'suspend ARQ reset' signal from an ARQ transmitter;
    deactivating a receiver ARQ sync loss timer; and
    transmitting ARQ feedback to the ARQ transmitter in response to the receiving.

14. The method of claim 13 further comprising:
    receiving another 'suspend ARQ reset' signal; and
    transmitting ARQ feedback.

15. A communication device for suspending an Automatic Repeat Request (ARQ) reset comprising:
- a transceiver capable of operating in an ARQ transmitter mode;
- a processor, coupled to the transceiver, having a clock; and
- an ARQ sync loss timer coupled to the processor, wherein the processor deactivates the ARQ sync loss timer when there are no data blocks currently available for transmission in the ARQ transmitter mode.

16. The communication device of claim 15 wherein the transceiver sends a 'suspend ARQ reset' signal to an ARQ receiver indicating that the ARQ sync loss timer is inactive.

17. The communication device of claim 15 wherein the processor activates the ARQ sync loss timer when there are data blocks currently available for transmission in the ARQ transmitter mode.

18. The communication device of claim 17 wherein the transceiver sends a 'resume ARQ reset' signal indicating that the ARQ sync loss timer is active.

19. A communication device for suspending an Automatic Repeat Request (ARQ) reset comprising:
- a transceiver capable of operating in an ARQ receiver mode;
- a processor, coupled to the transceiver, having a clock; and
- an ARQ sync loss timer coupled to the processor, wherein the processor deactivates the ARQ sync loss timer when the transceiver receives a 'suspend ARQ reset' signal from an ARQ transmitter and wherein the processor activates the ARQ sync loss timer when the transceiver receives a 'resume ARQ reset' signal from the ARQ transmitter.

* * * * *